(12) United States Patent
Cao et al.

(10) Patent No.: US 11,366,493 B2
(45) Date of Patent: *Jun. 21, 2022

(54) INPUT DEVICES INCORPORATING BIOMETRIC SENSORS

(71) Applicant: Apple Inc., Cupertino, CA (US)

(72) Inventors: Robert Y. Cao, San Francisco, CA (US); Michael K. McCord, San Francisco, CA (US); Simon R. Lancaster-Larocque, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/951,446

(22) Filed: Nov. 18, 2020

(65) Prior Publication Data

US 2021/0096594 A1    Apr. 1, 2021

Related U.S. Application Data

(63) Continuation of application No. 16/355,540, filed on Mar. 15, 2019, now Pat. No. 10,853,614, which is a
(Continued)

(51) Int. Cl.
*G06F 21/32* (2013.01)
*G06F 1/16* (2006.01)
(Continued)

(52) U.S. Cl.
CPC ............ *G06F 1/165* (2013.01); *G06F 1/1607* (2013.01); *G06F 1/1616* (2013.01);
(Continued)

(58) Field of Classification Search
CPC ...... G06F 21/32; G06F 1/1616; G06F 1/1637; G06F 1/1662; G06F 1/1681; G06F 3/02; G06F 1/1671; G06F 1/1607; G06F 1/1647; G06F 1/165; G06F 1/1692; G06F 2203/04105; G06F 3/017; G06F 3/041; G06F 3/0414; G06F 3/0412; G06F 3/021;
(Continued)

(56) References Cited

U.S. PATENT DOCUMENTS 4,032,728 A * 6/1977 Oelsch .................. H01H 13/36
200/5 A
4,405,845 A * 9/1983 Kondo .................. H01H 13/48
200/283
(Continued)

FOREIGN PATENT DOCUMENTS

CN    1255785    6/2000
CN    1787557    6/2006
(Continued)

*Primary Examiner* — Md Saiful A Siddiqui
(74) *Attorney, Agent, or Firm* — Brownstein Hyatt Farber Schreck, LLP

(57) ABSTRACT

A button assembly for an electronic device is disclosed. The button assembly integrates a biometric sensor below a top surface of the button. The button assembly is positioned relative to a secondary display of an electronic device. The secondary display can be positioned relative to a keyboard, such as above a top row of keys of the keyboard.

20 Claims, 8 Drawing Sheets

Related U.S. Application Data continuation of application No. 15/239,977, filed on Aug. 18, 2016, now Pat. No. 10,402,617.

(60) Provisional application No. 62/235,538, filed on Sep. 30, 2015.

(51) Int. Cl.

| | | |
|---|---|---|
| *G06K 9/00* | (2022.01) | |
| *G06F 3/041* | (2006.01) | |
| *G06V 40/13* | (2022.01) | |
| *G06V 40/12* | (2022.01) | |
| *H01H 13/14* | (2006.01) | |
| *H01H 13/52* | (2006.01) | |
| *H01H 13/86* | (2006.01) | |
| *H05K 5/00* | (2006.01) | |
| *G06F 3/02* | (2006.01) | |
| *G06F 3/01* | (2006.01) | |

(52) U.S. Cl.
CPC .......... *G06F 1/1637* (2013.01); *G06F 1/1647* (2013.01); *G06F 1/1662* (2013.01); *G06F 1/1671* (2013.01); *G06F 1/1681* (2013.01); *G06F 1/1692* (2013.01); *G06F 3/021* (2013.01); *G06F 3/0412* (2013.01); *G06F 3/0414* (2013.01); *G06F 21/32* (2013.01); *G06V 40/13* (2022.01); *G06V 40/1306* (2022.01); *G06V 40/1365* (2022.01); *H01H 13/14* (2013.01); *H01H 13/52* (2013.01); *H01H 13/86* (2013.01); *H05K 5/0017* (2013.01); *H05K 5/0086* (2013.01); *G06F 3/017* (2013.01); *G06F 3/02* (2013.01); *G06F 3/041* (2013.01); *G06F 2203/04105* (2013.01); *H01H 2221/08* (2013.01)

(58) Field of Classification Search
CPC .... H05K 5/0017; H01H 13/52; G06K 9/0002; G06K 9/00087
See application file for complete search history.

(56) References Cited

U.S. PATENT DOCUMENTS

| | | | |
|---|---|---|---|
| 5,712,459 A | 1/1998 | Ziegler | |
| 5,793,355 A | 8/1998 | Youens | |
| 5,823,326 A * | 10/1998 | Saito | H01H 13/562 |
| | | | 200/524 |
| 5,999,095 A | 12/1999 | Earl | |
| 6,163,326 A | 12/2000 | Klein | |
| 6,166,722 A | 12/2000 | Kawabe | |
| 6,213,403 B1 | 4/2001 | Bates, III | |
| 6,347,040 B1 | 2/2002 | Fries | |
| 6,525,932 B1 | 2/2003 | Ohnishi | |
| 6,628,757 B1 | 9/2003 | Cannon | |
| 6,628,814 B1 | 9/2003 | Shapiro | |
| 6,697,251 B1 | 2/2004 | Aisenberg | |
| 6,804,121 B2 | 10/2004 | Fischbach | |
| 7,244,898 B2 | 7/2007 | Kim | |
| 7,376,841 B2 | 5/2008 | Sanchez-Cifuentes | |
| 7,545,621 B2 | 6/2009 | Haddad | |
| 7,613,446 B2 | 11/2009 | Engstrom et al. | |
| 7,813,534 B2 | 10/2010 | Ryhanen | |
| 7,863,533 B2 | 1/2011 | Hamel et al. | |
| 7,898,815 B2 | 3/2011 | Tanaka et al. | |
| 7,981,567 B2 | 7/2011 | Yoshimura et al. | |
| 8,019,131 B2 | 9/2011 | Wong et al. | |
| 8,199,007 B2 | 6/2012 | Coakley | |
| 8,358,499 B2 | 1/2013 | Jacobs | |
| 8,456,378 B2 | 6/2013 | Kakie | |
| 8,562,425 B2 | 10/2013 | Englman et al. | |
| 8,797,725 B2 | 8/2014 | Wei | |
| 8,810,367 B2 | 8/2014 | Mullins | |
| 8,824,136 B1 | 9/2014 | Interian, III | |
| 9,098,735 B2 | 8/2015 | Cho et al. | |
| 9,155,367 B2 | 10/2015 | Fathollahi et al. | |
| 9,230,150 B1 | 1/2016 | Merrell | |
| 9,250,660 B2 | 2/2016 | Ballard | |
| 9,251,329 B2 | 2/2016 | Lien et al. | |
| 9,256,719 B2 | 2/2016 | Berini et al. | |
| 9,256,720 B2 | 2/2016 | Berini et al. | |
| 9,322,794 B2 | 4/2016 | Setlak et al. | |
| 9,411,446 B2 | 8/2016 | Lombardi et al. | |
| 9,443,071 B2 | 9/2016 | Horton | |
| 9,547,336 B2 | 1/2017 | Lee | |
| 9,557,771 B2 | 1/2017 | Park et al. | |
| 9,560,042 B2 | 1/2017 | Okazaki | |
| 9,697,409 B2 | 7/2017 | Myers | |
| 9,721,107 B2 | 8/2017 | Han et al. | |
| 9,811,707 B2 | 11/2017 | Osborne et al. | |
| 9,875,599 B2 | 1/2018 | Onitsuka | |
| 9,922,229 B2 | 3/2018 | Cao et al. | |
| 9,927,895 B2 | 3/2018 | Ligtenberg et al. | |
| 9,946,913 B2 | 4/2018 | Liu et al. | |
| 10,043,052 B2 | 8/2018 | Wickboldt et al. | |
| 10,089,512 B2 | 10/2018 | Cao et al. | |
| 10,192,044 B2 | 1/2019 | Choe et al. | |
| 10,402,617 B2 | 9/2019 | Cao et al. | |
| 10,853,614 B2 | 12/2020 | Cao et al. | |
| 2007/0255961 A1 | 11/2007 | Tracy et al. | |
| 2008/0049980 A1* | 2/2008 | Castaneda | G06V 40/13 |
| | | | 382/115 |
| 2008/0238878 A1 | 10/2008 | Wang | |
| 2009/0315867 A1 | 12/2009 | Sakamoto et al. | |
| 2012/0019356 A1 | 1/2012 | Gagneraud | |
| 2012/0229435 A1 | 9/2012 | Hoshi et al. | |
| 2013/0129310 A1* | 5/2013 | Shustorovich | H04N 5/775 |
| | | | 386/230 |
| 2014/0140587 A1* | 5/2014 | Ballard | G06F 21/32 |
| | | | 382/124 |
| 2015/0071508 A1 | 3/2015 | Boshra | |
| 2015/0146944 A1* | 5/2015 | Pi | G06F 21/83 |
| | | | 382/124 |
| 2015/0363997 A1* | 12/2015 | Onitsuka | G07F 17/3211 |
| | | | 463/32 |
| 2015/0378546 A1 | 12/2015 | Osborne et al. | |
| 2016/0054826 A1 | 2/2016 | Huppi et al. | |
| 2016/0147328 A1 | 5/2016 | Doi et al. | |
| 2016/0154955 A1 | 6/2016 | Motoe et al. | |
| 2016/0283022 A1 | 9/2016 | Yang et al. | |
| 2016/0337559 A1* | 11/2016 | Liu | G06V 40/13 |
| 2017/0052611 A1 | 2/2017 | Komatsu et al. | |
| 2017/0061109 A1 | 3/2017 | Takenouchi | |
| 2017/0091512 A1 | 3/2017 | Kumano | |

FOREIGN PATENT DOCUMENTS

| | | |
|---|---|---|
| CN | 1918537 | 2/2007 |
| CN | 2891062 | 4/2007 |
| CN | 101461219 | 6/2009 |
| CN | 201594229 | 9/2010 |
| CN | 102138112 | 7/2011 |
| CN | 102422304 | 4/2012 |
| CN | 102611774 | 7/2012 |
| CN | 103677283 | 3/2014 |
| CN | 104656963 | 5/2015 |
| JP | U H05-055214 | 7/1993 |
| JP | 2006155455 | 6/2006 |
| JP | 2011018085 | 1/2011 |
| KR | 20040067373 | 7/2004 |
| KR | 20050045669 | 5/2005 |
| TW | 200925841 | 6/2009 |
| TW | 201222347 | 6/2012 |
| WO | WO 10/126504 | 11/2010 |
| WO | WO 14/124165 | 8/2014 |

* cited by examiner

INPUT DEVICES INCORPORATING BIOMETRIC SENSORS

CROSS-REFERENCE TO RELATED APPLICATION(S)

This application is a continuation of U.S. patent application Ser. No. 16/355,540, filed Mar. 15, 2019, and titled "Input Devices Incorporating Biometric Sensors," which is a continuation of U.S. patent application Ser. No. 15/239,977, filed Aug. 18, 2016, and titled "Input Devices Incorporating Biometric Sensors," now U.S. Pat. No. 10,402,617, which is a nonprovisional patent application of U.S. Provisional Patent Application No. 62/235,538, filed Sep. 30, 2015, and titled "Input Devices Incorporating Biometric Sensors," the disclosures of which are hereby incorporated herein by reference in their entirety.

FIELD

Embodiments described herein generally relate to user-input devices and, more particularly, to input devices configured to biometrically authenticate users thereof.

BACKGROUND

An electronic device can include one or more buttons. A button is typically associated with one or more functions or operations of the electronic device. In some examples, a user of the electronic device may desire to restrict control of (and/or access to) an associated function or operation of a particular button to a limited set of authorized users.

Upon activation of the button, the conventional electronic device may require a password or passcode before the restricted function or operation of the button is performed, thereby halting certain operations of the conventional electronic device until the password or passcode is supplied.

SUMMARY

Certain embodiments described herein generally relate to buttons that incorporate biometric sensors. A biometric sensor associated with such a button can be used by the electronic device to restrict access to features or functionality of the electronic device associated with that button. Such buttons are generally referred to herein as "restricted-access buttons."

For example, an electronic device such as described herein can include a housing with a top portion and a bottom portion connected by a hinge. The electronic device can integrate a primary display into the top portion of the housing, a keyboard into the bottom portion of the housing, a secondary display into the bottom portion of the housing between the keyboard and the hinge, and a restricted-access button abutting an end of the secondary display within the bottom portion of the housing. The restricted-access button can include a biometric sensor, such as a fingerprint sensor. In these embodiments, the electronic device can obtain an image of a fingerprint each time the restricted-access button is pressed by a user. Thereafter, the electronic device can determine whether the obtained fingerprint image matches that of a previously authorized user, and if so, the electronic device can perform an action.

Further embodiments relate to components and assemblies that may be used to form a restricted-access button such as described herein. For example, in some embodiments, a button assembly can include an electrical switch, such as a compressible dome switch, in addition to the biometric sensor. The compressible dome switch can be formed from any number of suitable materials including, but not limited to: metal, plastic, rubber, conductive or non-conductive polymer, gels and so on. In some cases, the electrical switch may be an inverted dome switch, but this may not be required of all embodiments. The electrical switch can be placed below the biometric sensor so that operation of the biometric sensor may not be negatively affected by the presence of the electrical switch.

In some embodiments, a seal (e.g., ring seal, gasket seal, caulking, and so on) can be positioned around the standoff(s) so as to seal the gap between the standoff and the sidewalls of the through-hole(s). In many cases, the seal may provide a liquid-impermeable barrier between the standoff and the sidewalls of the through-hole. Additionally, one or more seals can be disposed between the surfaces of either (or both) of the spring plate to the housing of the electronic device.

In some embodiments, the biometric sensor and the electrical switch may couple to a flexible circuit. The flexible circuit may be configured to fold below the button assembly over a top surface of the housing of the electronic device. The flexible circuit may be concealed behind an element or feature of the electronic device that is positioned adjacent to the button assembly. For example, in one embodiment, the button assembly may be positioned next to a substantially flat input surface such as, but not limited to: a touch sensitive display, an adaptive input row, a force sensitive input surface, and so on. In other examples, the flexible circuit may be concealed behind another feature of the electronic device.

BRIEF DESCRIPTION OF THE FIGURES

Reference will now be made to representative embodiments illustrated in the accompanying figures. It should be understood that the following descriptions are not intended to limit the embodiments to one preferred embodiment. To the contrary, it is intended to cover alternatives, modifications, and equivalents as may be included within the spirit and scope of the described embodiments as defined by the appended claims.

The use of the same or similar reference numerals in different figures indicates similar, related, or identical items.

Figure 1A:
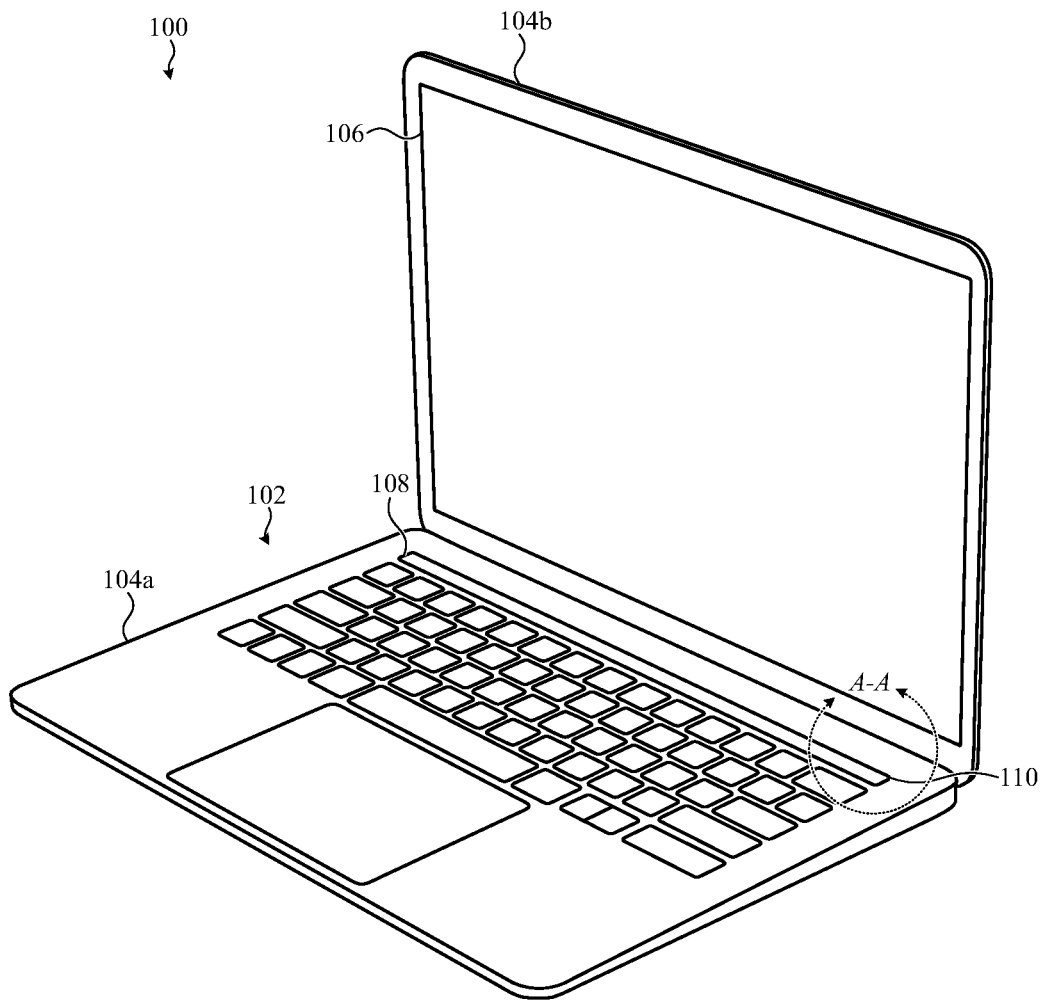
FIG. 1A depicts an example electronic device incorporating a restricted-access button.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein generally reference an input component for an electronic device that incorporates a biometric sensor. An input component as described herein can be any suitable input component such as, without limitation: a button, a key, a scroll wheel, a joystick, a force sensor, a touch sensor, and so on. Accordingly, although many embodiments described below reference buttons or keys as example input components, it may be appreciated that any suitable input component may incorporate a biometric sensor using the systems and methods described herein.

In some embodiments, a button of an electronic device incorporates a biometric sensor. As used herein, the term "biometric sensor" generally refers to a sensor configured to obtain data related to one or more physiological or biometrically-identifying characteristics of a biological subject. The electronic device may utilize the biometric sensor in order to determine and/or authenticate an identity of a user of the electronic device. In many embodiments, the biometric sensor may be incorporated within a power button of the electronic device.

In other cases, the electronic device utilizes the biometric sensor of a particular button in order to control and/or limit access to a function or operation of the electronic device associated with that button to a limited set of previously-authorized users. Herein, such a restriction is generally referred to as a "restricted action" or a "restricted function" of a button that may be performed only after the biometric sensor is used to authenticate the identity of a user that presses the button.

For example, in one embodiment, a power button of an electronic device may incorporate a biometric sensor (e.g., a fingerprint sensor). One or more functions associated with the power button may be restricted functions that can only be performed by an authorized user. For example, turning on or off the electronic device may be a restricted function that can only be performed by an authorized user or group of users. In this example, when the power button is pressed, an image of a fingerprint may be obtained and compared to the previously-obtained fingerprint images of the limited set of authorized users. If it is determined that the obtained image matches that of one of the previously-obtained fingerprint images of the limited set of authorized users, then the electronic device may perform the operation associated with the power button (e.g., turn on, turn off, enter a standby state, and so on). Alternatively, if it is determined that the obtained image does not match that of one of the previously-obtained fingerprint images of the limited set of authorized users, the electronic device may not perform the operation associated with the power button. In some cases, the electronic device may notify the user that access is denied. In other cases, the electronic device may not respond in any manner.

In many cases, the biometric sensor incorporated within a button may be a fingerprint sensor; however, this may not be required of all embodiments and other suitable biometric sensors may be included such as, but not limited to: heartrate sensors, skin temperature sensors, galvanic skin response sensors, vein imaging sensors, iris imaging systems, and so on. Accordingly, although many embodiments are described below with reference to fingerprint sensors, it may be appreciated that any suitable or implementation-specific biometric sensor may be substituted therefor. Herein, a button incorporating a fingerprint sensor is referred to as a "restricted-access button."

A restricted-access button may be incorporated into an electronic device in any suitable manner. For example, in some embodiments, a restricted-access button can extend some distance from a housing of an electronic device incorporating the same. For example, such a button may be, without limitation: a key of a keyboard, a function button, a command button, an alternative button, a control button, a power button, a shutter button, a space bar, an eject button, a mode button, a settings button, a network connection button, a restart button, a reset button, a factory restore button, an erase button, a shortcut button, an audio volume button, an exit button, a quit button, a multifunction button, and so on. An electronic device incorporating such a button can be, without limitation: a laptop computer, a desktop computer, a tablet computer, a peripheral input device, an imaging device, a head unit device, a navigation device, an industrial control device, a wearable electronic device, a multimedia device, and so on.

For many embodiments described herein, a restricted-access button is a multifunction and multimodal button. For example, the button may be a shutter button of a camera device that, when pressed by a user, causes an image or video of a subject to be captured. In other words, the shutter button may be associated with an image capture mode, a video capture mode, an auto focus mode, or any other suitable mode. In these examples, different modes of the button may be associated with restricted functions whereas other modes of the buttons may be associated with unrestricted functions. As used herein, the phrases "unrestricted function" or "unrestricted action" refer to functions or operations associated with a button incorporating a fingerprint sensor that may be performed without using the fingerprint sensor to authenticate the identity of a user that presses the button. In other words, it is appreciated that restricted-access buttons such as described herein may be configured to perform both restricted functions and unrestricted functions. Further, it may be appreciated that, in some configurations, a restricted-access button may be adapted to perform only unrestricted functions; in other words, a fingerprint sensor of a restricted-access button may be disabled and/or may be configured to be used in a manner disassociated with the functionality of the button in which it is contained.

Returning to the example presented above, a shutter button of a camera device can be a restricted-access button. In some examples, the shutter button may be a multimodal button associated with both restricted functions and unrestricted functions. For example, an image capture function may be a restricted function whereas an autofocus function may be an unrestricted function. The camera may change the restriction status of a particular function from time to time. Herein, the phrase "restriction status" refers generally to whether a particular function of a restricted-access button is a restricted function or an unrestricted function.

In many embodiments, a restricted-access button is configured to integrate with other input components of an electronic device. For example, a restricted-access button may be incorporated as a key of a keyboard. In other cases, each key of a keyboard may be a restricted-access button.

In these embodiments, a restricted-access button may include cosmetic features and characteristics matching those of other input components or other features of an electronic device nearby the restricted-access button. In one example, a top surface of a restricted-access button is aligned and substantially coplanar with a top surface of another input component that is positioned adjacent the button. The other component can be, without limitation: another button; another restricted-access button; a portion of the housing of the electronic device; another input device such as a trackpad, keyboard, touch screen, scroll bar, a microphone, and so on; a non-input device such as a display, speaker grill, or input/output port; and so on. In many embodiments, the restricted-access button may form a substantially continuous and/or contiguous surface with other components nearby.

A restricted-access button such as described herein is typically formed from multiple individual components collectively referred to as a "button assembly." In one example, the button assembly includes a button cap, an electrical switch, a fingerprint sensor, a standoff, and a spring plate. In many cases, the button assembly is configured to couple to a housing of an electronic device. Generally and broadly, the button cap is positioned above the fingerprint sensor, which in turn is positioned above the electrical switch. Collectively, the button cap, the fingerprint sensor, and the electrical switch are referred to herein as the "upper assembly portion" of a button assembly of a restricted-access button.

The upper assembly portion may be attached to the housing of the electronic device in any suitable manner. In some embodiments, the upper assembly portion may be movable with respect to the housing, although this is not required (e.g., the upper assembly portion may be fixed with respect to the housing for some embodiments). Herein, an upper assembly portion that is fixed with respect to the housing is referred to as a "fixed upper assembly" whereas an upper assembly portion that is movable with respect to the housing is referred to as a "movable upper assembly."

A fixed upper assembly is typically disposed in a manner such that the restricted-access button sits flush with the housing of an electronic device incorporating the same. However, in other examples, a fixed upper assembly may extend proud of the surface of a housing of an electronic device incorporating the same. In these examples, the height of the fixed upper assembly may be selected to be approximately equal to the height of an element adjacent to the restricted-access button. In one example, a fixed upper assembly is positioned above the keys of a keyboard; the height of the fixed upper assembly may be approximately equal to the height of the keys of that keyboard. In many embodiments, an electric switch of a fixed upper assembly may be a soft button, such as a capacitive button, that detects the presence of a user's fingertip. In other cases, the electrical switch may be a force sensitive switch that detects and/or measures the force with which a user applies a fingertip to the button assembly. In some cases, the fingerprint sensor itself may be used as a soft button; the electrical switch may be omitted in certain embodiments implementing a fixed upper assembly.

A movable upper assembly of a movable button may be constrained along one direction and permitted to move along another direction (e.g., axis). In one embodiment, the movable upper assembly may be substantially constrained in the X-direction and the Y-direction while being unconstrained (but bounded) in the Z-direction. In other words, the upper assembly portion may be permitted, without certain bounds, to translate along the Z-direction. In other cases, a movable upper assembly may be bounded in another manner. In one embodiment, a movable upper assembly may be configured as a cantilever. In many embodiments, an electric switch of a movable upper assembly may be a compressible switch, such as a dome switch, that collapses upon an application of force by a user's fingertip. In many examples, the dome switch may be placed in contact with a housing of an electronic device incorporating the restricted-access switch; when a downward force is applied to the button cap, the dome switch pushes against the housing of the electronic device to facilitate the collapse of the dome. The compressible portion of the dome switch can be formed from any number of suitable materials including, but not limited to: metal, plastic, rubber, conductive or non-conductive polymer, gels, and so on. In some cases, the electrical switch may be an inverted dome switch, but this may not be required of all embodiments. The electrical switch is typically placed below the fingerprint sensor so that the operation of fingerprint sensor may not be negatively affected by the presence of the electrical switch.

In many embodiments, the fingerprint sensor and the electrical switch may couple to a flexible circuit. The flexible circuit may be configured to fold below the button assembly over a top surface of a housing of an electronic device incorporating the same. The flexible circuit may be concealed behind an element or feature of the electronic device that is positioned adjacent to the button assembly. For example, in one embodiment, the button assembly may be positioned next to a substantially flat input surface such as, but not limited to: a touch sensitive display, an adaptive input row, a force sensitive input surface, and so on. In other examples, the flexible circuit may be concealed behind another feature of the electronic device.

These and other embodiments are discussed below with reference to FIGS. 1-6. However, those skilled in the art will readily appreciate that the detailed description given herein with respect to these Figures is for explanatory purposes only and should not be construed as limiting.

Figure 1B:
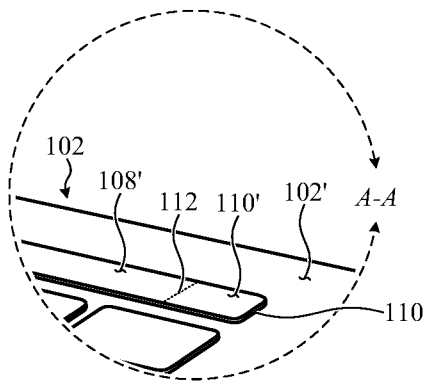
FIG. 1B depicts a detail view of the region A-A depicted in FIG. 1A, showing an electronic device embodiment in which the restricted-access button extends proud of a surface of a housing of the electronic device.
Figure 1C:
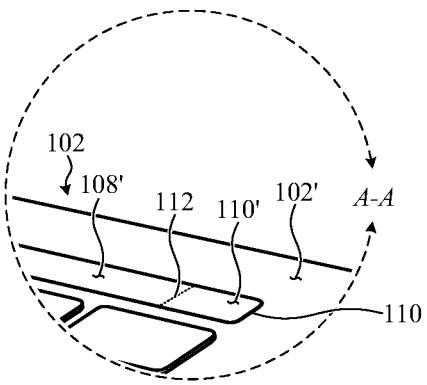
FIG. 1C depicts a detail view of the region A-A depicted in FIG. 1A, showing an electronic device embodiment in which the restricted-access button is flush with a surface of a housing of the electronic device.

FIGS. 1A-1C generally depict an example electronic device that may incorporate a restricted-access button. As illustrated, the electronic device is a foldable laptop computing device, although such an implementation is not required. In the illustrated embodiment, the foldable laptop computing device (more generally, the "laptop") includes a top clamshell portion and a bottom clamshell portion. The bottom clamshell portion incorporates a keyboard including multiple rows of depressible keys. The restricted-access button is positioned adjacent to a rectilinear display area (e.g., a touch-sensitive display) which itself is generally positioned adjacent to the uppermost row of keys and below a display which is incorporated into the top clamshell portion of the laptop. In some cases, the restricted-access button is abutting an end of the rectilinear display. Typically, the top clamshell portion is connected to the bottom clamshell portion by a hinge, but this may not be required of all embodiments; the top clamshell portion can be removable with respect to the bottom clamshell portion. The restricted-access button may have a fixed upper assembly or a movable upper assembly and may extend proud of the housing of the keyboard (e.g., FIG. 1B) or may be flush with the housing of the keyboard (e.g., FIG. 1C). In the illustrated embodiment, the restricted-access button is configured to form a substantially continuous surface with the rectilinear display area.

More specifically, FIG. 1A depicts the laptop 100 in an open position. The laptop 100 includes a keyboard 102 with multiple rows of depressible keys, each key extending from (or flush with) a lower housing portion 104a (e.g., a bottom clamshell portion) of the laptop 100. The laptop 100 also includes a main display 106 in an upper housing portion 104b (e.g., a top clamshell portion). A user of the laptop 100 may utilize the keyboard 102 as an interface to interact with the laptop 100. More specifically, the user may utilize the laptop 100 to interact with a user interface presented by the laptop 100, at least in part, on the main display 106.

The laptop 100 also includes a touch-sensitive display 108. The touch-sensitive display 108 can be generally positioned above the topmost row of keys of the keyboard 102. The touch-sensitive display 108 may include a secondary display used to present a set of indicia or visual cues that correspond to a set of commands or functions that may be selected by a user of the laptop 100. The touch-sensitive display 108 may be responsive to a user touch or force input. In some cases, the touch-sensitive display 108 can be used to perform similar functionality as a traditional static function row of a conventional keyboard.

As noted above, the touch-sensitive display 108 can be configured to display a set of visual indicia that correspond to one or more input modes of the laptop 100 or the keyboard 102. The indicia on the display may correspond to, but are not limited to, one or more of the following: a hardware-dependent input mode used to control one or more devices or hardware elements of the laptop 100 or the keyboard 102; a software-dependent input mode used to control one or more aspects of a software program being executed on the laptop 100; a user-defined mode that is configurable by a user of the laptop 100 or the keyboard 102; and other input mode examples which are described herein. The display of the touch-sensitive display 108 may be used to present a set of static indicia, one or more animated indicia, or a combination of static and animated indicia.

The display of the touch-sensitive display 108 may be integrated with one or more touch sensors and/or force sensors that are configured to detect various combinations of user touch and force input (e.g., gestures) on the surface of the touch-sensitive display 108. The touch and/or force sensors may provide a touch-sensitive surface that is configured to detect the location of a touch, a magnitude, and/or direction of force applied, and/or a movement of the touch along the touch-sensitive display 108. The touch and/or force sensors may be used separately or in combination to interpret a broad range of user inputs such as, but not limited to: touch-based gestures, force-based gestures, touch patterns, tap patterns, single-finger gestures, multi-finger gestures, multi-force gestures, and so on.

A restricted-access button 110 is positioned adjacent to the touch-sensitive display 108. In many embodiments, the restricted-access button 110 includes a fingerprint sensor that may be used, optionally, to obtain an image of a fingerprint of a user pressing the user's fingertip against the restricted-access button 110. As noted with respect to other embodiments described herein, the restricted-access button 110 can be used by the laptop 100 and/or the keyboard 102 to facilitate controlled access to the features and/or operations associated with the restricted-access button 110.

In one embodiment, a top surface 110' of the restricted-access button 110 may be configured to be substantially flush with a top surface 108' of the touch-sensitive display 108 (see, e.g., FIG. 1B) and/or flush with the lower housing portion 104a. In other cases, the top surface 110' of the restricted-access button 110 may be configured to be substantially flush with a top surface 102' of the lower housing portion 104a of the laptop 100 (see, e.g., FIG. 1B). In many cases, and as illustrated, the restricted-access button 110 may be positioned immediately adjacent to or abutting the touch-sensitive display 108 such that a seam 112 between the touch-sensitive display 108 and the restricted-access button 110 may be substantially hidden (see, e.g., FIGS. 1B-1C). While the restricted-access button 110 may abut the touch-sensitive display 108, there may be a small gap (e.g., less than 5 mm) between the two components. In some cases, the touch-sensitive display 108 and the restricted-access button 110 may be formed from the same material and/or share some of the same components. In these embodiments, the restricted-access button 110 forms a portion of the touch-sensitive display 108.

In one example, the restricted-access button 110 is a multimodal power button. The power button may be configured to change a power state of the laptop 100 and/or a power state of the keyboard 102.

In one example, when a user presses the power button, the keyboard 102 can send a signal to the laptop 100 that the button has been pressed. In response thereto, the laptop 100 may transition to a different power state such as, but not limited to: an on power state, an off power state, a standby power state, a low power state, or any other suitable power state. One or more functions of the power button may be restricted functions whereas other functions of the power button may be unrestricted functions. More specifically, the operation of transitioning between various power states, performed by the laptop 100 in this example, may be restricted actions or may be unrestricted actions. In one example, a transition to an on power state from an off power state may be an unrestricted action whereas a transition to an off power state from an on power state may be a restricted action. In another non-limiting phrasing, the laptop 100 may permit any user to turn on the laptop 100 or another associated electronic device, while permitting only certain users to turn off the laptop 100.

In these examples, when a user presses the restricted-access button 110, the laptop 100 may first determine whether the action or function sought to be performed by the laptop 100 or the keyboard 102 is a restricted action or an unrestricted action. If the action is a restricted action, then an image of a fingerprint may be obtained by the fingerprint sensor of the restricted-access button 110. The obtained fingerprint image may then be compared to each fingerprint image (or templates) of a set of previously-obtained fingerprint images (or templates) to determine whether the user who pressed the restricted-access button 110 is authorized to perform the requested function. Alternatively, if the action is an unrestricted action, the laptop 100 may perform the action without first obtaining a fingerprint image.

In further embodiments, the restricted-access button 110 can be configured to operate in a different manner. For example, the restricted-access button 110 may be configured to record and/or log the identity of the last user to touch the restricted-access button 110 and/or information related to unrecognized fingerprints obtained by the restricted-access button 110.

In some cases, the operation of obtaining a fingerprint image and comparing the fingerprint to a set of known images may be performed by the laptop 100. In other examples, the operation may be performed by the laptop 100. In still further examples, the operation may be performed by a processor or circuitry coupled to or disposed within the restricted-access button 110.

After a fingerprint obtained by the fingerprint sensor of the restricted-access button 110 is recognized, one of a variety of operations may be performed by the laptop 100, the keyboard 102, or the restricted-access button 110. For example, in one embodiment, after a fingerprint image is obtained by the fingerprint sensor of the restricted-access button 110 is recognized, the keyboard 102 may send a signal to the laptop 100 instructing the laptop 100 to perform the requested action. In another embodiment, after a fingerprint image is obtained by the fingerprint sensor of the restricted-access button 110 is recognized, the keyboard 102 may send an encrypted signal, security certificate, a password, or other information to the laptop 100 informing the laptop 100 that the keyboard 102 has identified a user. The laptop 100 may analyze the information received to determine whether the user is authorized to perform the requested task.

In further embodiments, the laptop 100 and/or the keyboard 102 can utilize the fingerprint sensor separately from the button containing the sensor. For example, fingerprint image data may be obtained from a user of the laptop 100 without a press of the button containing the fingerprint sensor. In still other cases, the fingerprint sensor may be configured to image a fingerprint of the user separately from activation of the respective button or associated action. More specifically, the button may have a default function that can be performed by the laptop 100 that may be changed, updated, augmented, or enhanced only after a fingerprint image is later recognized. For example, in these embodiments, a fingerprint image may be taken after the button is fully pressed.

In many cases, the laptop 100 and/or the keyboard 102 can require both a full button press and an authenticated fingerprint in order to perform a task. For example, if the button is a power button, a full button press by an authenticated user may be required to turn on the laptop 100 or the keyboard 102. In this manner, two different types of input are required to power on the electronic device.

In further embodiments, the laptop 100 and/or the keyboard 102 can utilize the fingerprint sensor within the restricted-access button 110 in a manner disassociated from the various functions and/or operations of the restricted-access button 110. For example, the laptop 100 may periodically request that a user of the laptop 100 or the keyboard 102 authenticate the user's identity by placing the user's fingertip on the restricted-access button 110. The laptop 100 may request that a user of the laptop 100 authenticate his or her identity in order to, without limitation: grant access to an application or program executed by the laptop 100, grant access to a feature of an application or program executed by the laptop 100, complete an electronic purchase, access confidential and/or private information stored on or otherwise accessible to the laptop 100, access system-level files and/or directories stored on or otherwise accessible to the laptop 100, approve or deny the establishment of a communication link between the laptop 100 and another local or remote electronic device, apply settings associated with a particular user to the laptop 100 or an application or program operating thereon, and so on.

The foregoing description of the embodiments depicted in FIGS. 1A-1C, and various alternatives thereof and variations thereto are presented, generally, for purposes of explanation, and to facilitate a thorough understanding of the detailed embodiments presented herein. However, it will be apparent to one skilled in the art that some of the specific details presented herein may not be required in order to practice a particular described embodiment, or an equivalent thereof. Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings. Particularly, it may be understood that the restricted-access button depicted in FIGS. 1A-1C can be implemented in a number of suitable and implementation-specific ways.

Figure 2A:
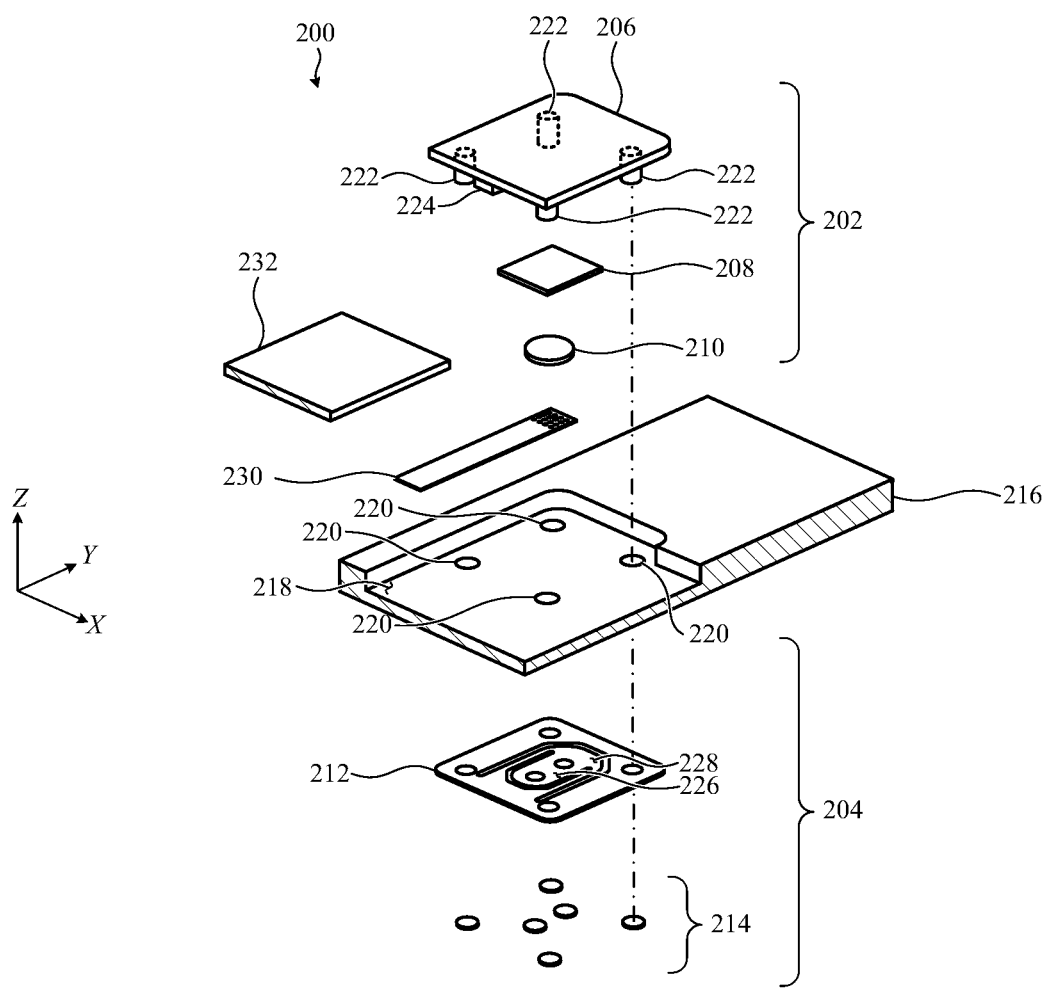
FIG. 2A depicts an exploded cross-section assembly view of the button assembly of FIG. 2B.

FIG. 2A depicts an exploded cross-section assembly view of the button assembly of FIG. 1C. The button assembly 200 includes an upper assembly portion 202 and a lower assembly portion 204. The upper assembly portion 202 includes a button cap 206, a fingerprint sensor 208, and a compressible dome switch 210. The lower assembly portion 204 includes a spring plate 212 and one or more fasteners 214.

Initially, reference is made to the interaction between the upper assembly portion 202, the lower assembly portion 204, and a housing 216 of an electronic device (such as the laptop 100 depicted in FIG. 1C) to which the button assembly 200 may be coupled.

Generally and broadly, the upper assembly portion 202 and the lower assembly portion 204 are configured to couple to one another through apertures defined in the housing 216. The housing 216 can be formed as an integral piece, or may be formed by removably or permanently adhering or otherwise attaching multiple parts to one another. Portions of the housing 216 can be made from any suitable material including, but not limited to: metal, amorphous metal, glass, sapphire, plastic, ceramic, synthetic material, organic material, and so on or any suitable implementation-specific combination or mixture of the same. In some cases, portions of the housing 216 may exhibit anisotropic or isotropic electrical or magnetic properties. The housing 216 may be formed in any number of suitable ways such as, but not limited to: machining, molding, insert molding, transfer molding, casting, or any other suitable process or combination of processes.

The housing 216 is shown in cutaway, exposing a portion of an indentation 218 into which the upper assembly portion 202 can be seated. The indentation 218 extends into the housing 216 from a top surface thereof. The depth of the indentation 218 may vary from embodiment to embodiment. The indentation 218 typically is sized to follow a perimeter shape of at least one element of the upper assembly portion 202. For example, as illustrated, the indentation 218 takes the general shape of a rounded rectangle. In other cases, the indentation 218 may take another shape. The indentation 218 may be formed in the housing in any number of suitable ways such as, but not limited to: machining, molding, transfer molding, casting, or any other suitable process or combination of processes.

The indentation 218 defines four independent through-holes, each identified as a through-hole 220. The upper assembly portion 202 includes a portion that extends through the through-holes 220 in order to couple to the lower assembly portion 204. In many embodiments, the through-holes 220 take a generally cylindrical shape, although this may not be required of all embodiments. Similarly, although in many embodiments four through-holes are included, this is not required. In other embodiments, a greater or smaller number of through-holes 220 may be implemented.

As noted above, the upper assembly portion 202 includes the button cap 206, the fingerprint sensor 208, and the compressible dome switch 210. Next, reference is made to the various portions, components, and features of the button cap 206.

The button cap 206 can be formed as an integral piece, or may be formed by removably or permanently adhering or otherwise attaching multiple parts to one another. Portions of the button cap 206 can be made from any suitable material including, but not limited to: metal, glass, sapphire, plastic, ceramic, synthetic material, organic material, and so on or any suitable implementation-specific combination or mixture of the same. In some cases, portions of the button cap 206 may exhibit anisotropic or isotropic electrical or magnetic properties. As illustrated, and in many embodiments, the button cap 206 may have a substantially flat upper (e.g., top) surface. In many cases, the upper surface of the button cap 206 may be formed, at least in part, from a material that exhibits properties specifically suitable for a button cap that may be pressed by a user many times over the operational life thereof. Suitable properties may include: oleophobic properties, hydrophobic properties, anti-reflective properties, mirror-like qualities, anti-scratch properties, anti-smudge properties, and so on.

Figure 3A:
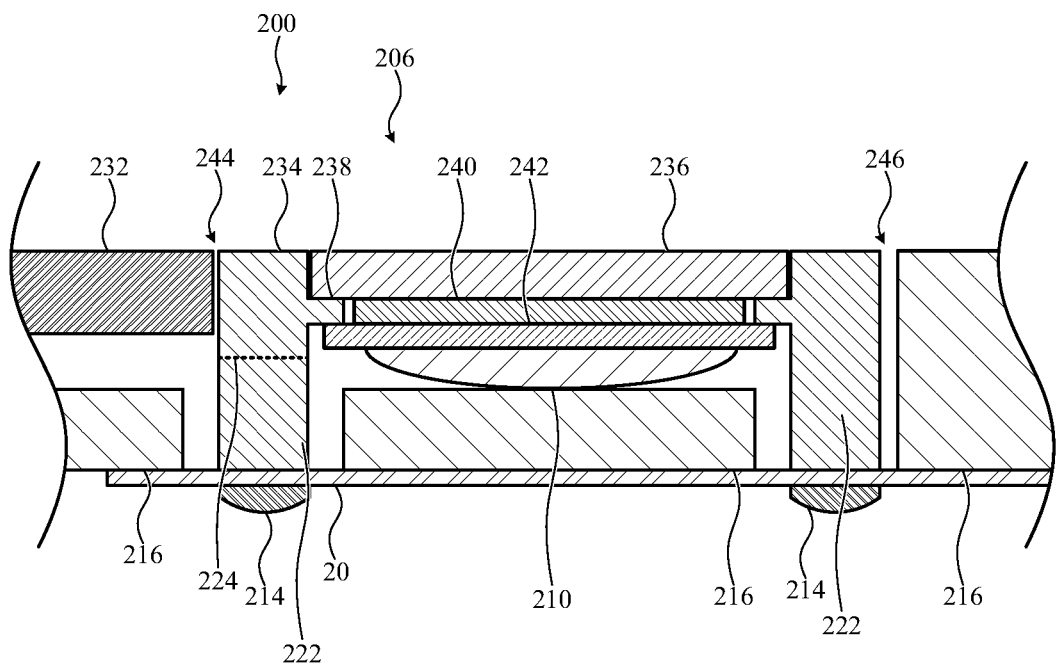
FIG. 3A depicts a cross-section view of the button assembly of FIG. 2B taken through section B-B of FIG. 2B.
Figure 3B:
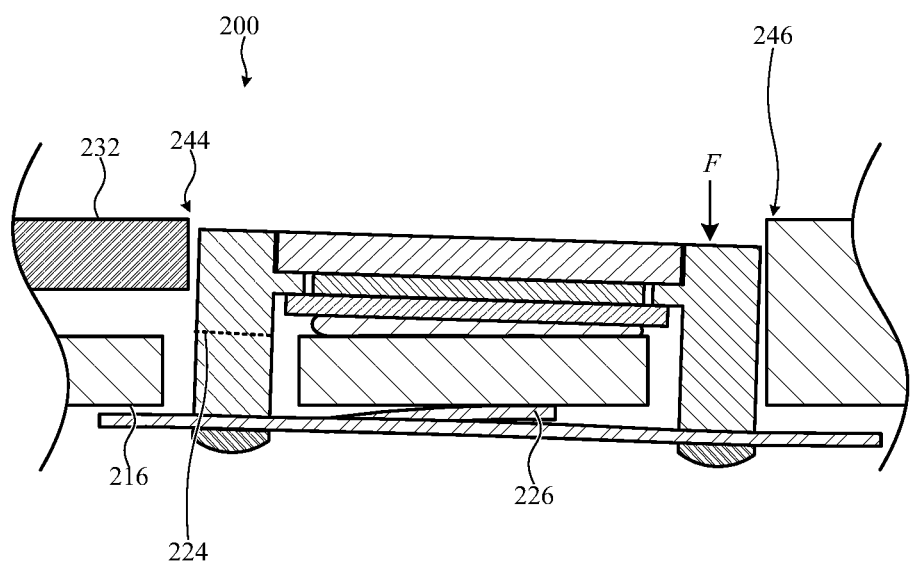
FIG. 3B depicts the button assembly of FIG. 3A deflecting in response to a downward force, such as may be applied by a user.
Figure 3C:
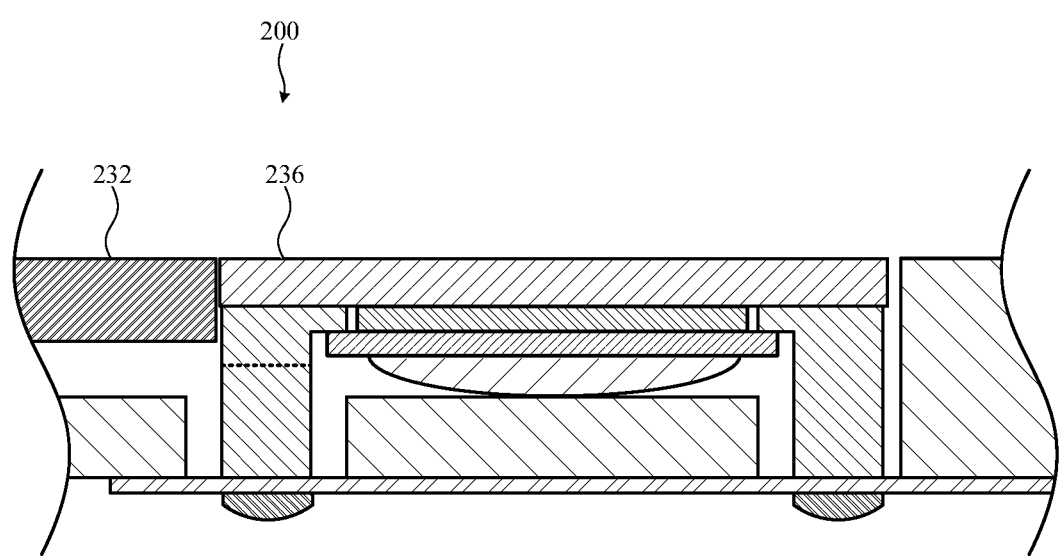
FIG. 3C depicts a cross-section view of another embodiment of a button assembly.

In some embodiments, the button cap 206 may include a frame and a cover (as shown in FIGS. 3A-3C). Portions of the frame of the button cap 206 can be made from any suitable material including, but not limited to: metal, glass, sapphire, plastic, ceramic, synthetic material, organic material, and so on or any suitable implementation-specific combination or mixture of the same. The cover is typically formed from a dielectric or insulating material such as, but not limited to: sapphire, glass, plastic.

The button cap 206 may be supported by four independent standoffs, each configured to sit within one of the through-holes 220. The standoffs are each identified in FIG. 2A as a standoff 222. Each of the standoffs 222 can be formed as an integral piece, or may be formed by removably or permanently adhering or otherwise attaching multiple parts to one another. Portions of an individual standoff can be made from any suitable material including, but not limited to: metal, glass, sapphire, plastic, ceramic, synthetic material, organic material, and so on or any suitable implementation-specific combination or mixture of the same. In some cases, portions of the individual standoff may exhibit anisotropic or isotropic electrical or magnetic properties. In many embodiments, the standoffs 222 take a generally cylindrical shape, although this may not be required of all embodiments. Similarly, although in many embodiments four standoffs are included, this is not required. In other embodiments, a greater or smaller number of standoffs may be implemented.

In many cases, each standoff can made from the same material, although this is not required. The standoffs 222 may each be rigid or may each be flexible, or different standoffs may have different relative flexibility. In some embodiments, the standoffs 222 may be formed as a portion of the frame of the button cap 206.

In some embodiments, a seal (e.g., ring seal, gasket seal, caulking, and so on) can be positioned around the standoffs 222 so as to seal the gap between each standoff and the sidewalls of the through-holes 220. In some cases, the seal may provide a liquid-impermeable barrier between the standoff 222 and the sidewalls of the through-hole 220. In other cases, the seal may electrically isolate the button assembly 200 from the housing 216. Additionally, one or more seals can be disposed between the surfaces of either (or both) of the spring plate 212 to the housing 216 of the electronic device.

The button cap 206 may also include a bumper 224. The bumper 224 may be configured to extend from a back surface of the button cap 206. The bumper 224 may be formed from the same material as a portion of the button cap 206 but this may not be required. For example, the bumper 224 may be formed from a material such as, but not limited to: rubber, foam, plastic, silicone, and the like.

The bumper 224 may be configured to impact a surface of the indentation 218. In this manner, the bumper 224 controls and/or bounds the travel of the button cap 206 as it is pressed downwardly by a user.

In some cases, such as illustrated, only a single bumper may be included. In these embodiments, the bumper 224 may also serve as a cantilever and/or fulcrum. In other words, once the button cap 206 is depressed by a user a sufficient distance such that the bumper 224 impacts a surface of the indentation 218, the button cap 206 may cantilever at an angle away from the bumper 224.

As noted above, the upper assembly portion 202 includes the button cap 206, the fingerprint sensor 208, and the compressible dome switch 210. Next, reference is made to the fingerprint sensor 208 and the compressible dome switch 210.

As noted above with respect to other embodiments described herein, a restricted-access button can include any number of suitable biometric sensors, one of which may be a fingerprint sensor. In the illustrated embodiment, the fingerprint sensor 208 takes a generally square shape, although this may not be required of all embodiments. For example, in some cases, the fingerprint sensor 208 can take a circular shape or a rectangular shape.

The fingerprint sensor 208 can be implemented with any suitable fingerprint imaging or detection technology including, but not limited to: capacitive sensing, optical sensing, electrical impedance sensing, acoustic impedance sensing, and so on. In some examples, the fingerprint sensor 208 can include multiple independent electrical components, in addition to the electrical components configured to obtain a fingerprint image. For example, the fingerprint sensor 208 can include, without limitation: analog circuit components, digital circuit components, processors, digital logic circuits, memory circuits, or any combination thereof.

In some embodiments, the fingerprint sensor 208 may include a two-dimensional array of electrodes such as capacitive sensors, electrical impedance sensors, ultrasonic sensors, and the like. The fingerprint sensor 208 may be disposed onto a bottom surface of the button cap 206 (or the cover thereof) such that when a user contacts the button cap 206 with the user's fingertip, an image of a fingerprint of the user may be obtained.

The compressible dome switch 210 may be any suitable dome switch that is configured to complete an electrical circuit on compression. In many examples, the compressible dome switch 210 includes a compressible dome that may be made from any number of suitable materials including but not limited to: metals, plastics, glass-doped plastics, polymers, and so on. In other example, the compressible dome switch 210 may be included solely to provide a haptic feedback.

Next, reference is made to the order with which the various elements and components of the upper assembly portion 202 are assembled. In many embodiments, and as illustrated, the fingerprint sensor 208 may be positioned below the button cap 206. The fingerprint sensor 208 may abut a bottom surface of the button cap 206. For embodiments in which the button cap 206 includes a frame and a cover, the fingerprint sensor 208 may be disposed at least partially within the frame, and may be positioned to abut an underside of the cover.

In many cases, the fingerprint sensor 208 may sit within an area circumscribed by the standoffs 222. For example, the fingerprint sensor 208 may be aligned such that each corner of the fingerprint sensor 208 is adjacent one of the standoffs 222. In another example, the fingerprint sensor 208 may be aligned at an angle with respect to the standoffs 222. For example, the fingerprint sensor 208 may be rotated forty-five degrees with respect to the layout of the standoffs 222.

In many embodiments, the compressible dome switch 210 is positioned below the fingerprint sensor 208. This configuration ensures that the operation of the fingerprint sensor 208 is not affected by the presence of the compressible dome switch 210. In some examples, the fingerprint sensor 208 and the compressible dome switch 210 may be coupled to one another; for example the compressible dome switch 210 may be adhered or otherwise attached to a back surface of the fingerprint sensor 208. In other embodiment, the compressible dome switch 210 and the fingerprint sensor 208 can be separated by one or more intermediate elements such as, but not limited to: foam pads, separators, spacer, shims, and so on.

The compressible dome switch 210 may be positioned above a surface of the indentation 218. In this manner, when a user presses the button cap 206 in a downward direction (e.g., in the negative Z direction), the compressible dome switch 210 may compress between the fingerprint sensor 208 and the surface of the indentation 218.

As noted above, in many embodiments the fingerprint sensor 208 is configured to move with the button cap 206 in response to a force by a user. In other cases, the fingerprint sensor 208 may be stationary and the button cap 206 may move with respect thereto.

Next, reference is made to the lower assembly portion 204, including the spring plate 212 and one or more fasteners 214.

Generally and broadly, the spring plate 212 serves to provide an upward biasing force to the button cap 206 via the standoffs 222. The spring plate 212 can be implemented in any number of suitable ways. For example, in the illustrated embodiment, the spring plate 212 is formed as a plate with two oppositely oriented cutout portions forming two independent tongues, each labeled as an inner tongue 226 and an outer tongue 228. The inner tongue 226 is defined within the outer tongue 228. In many cases, the spring plate 212 is formed from metal, but this may not be required of all embodiments. For example the spring plate 212 can be made from a layer of, or a laminate of, one or more of the following: metal, plastic, strengthened plastic, acrylic and so on.

In a typical embodiment, the spring plate 212 may be fastened to an inner surface of the housing 216. In many cases, one or more of the fasteners 214 can be used in order to attach the spring plate 212 to the housing 216. In one embodiment, the inner tongue 226 is directly coupled to the housing 216. In this manner, the remaining portions of the spring plate 212 may be configured to defect into the housing 216. More specifically, a perimeter of the spring plate 212, along with the outer tongue 228, may be configured to deflect away from the inner surface of the housing 216. In many examples, this configuration permits a substantially uniform (e.g., substantially planar in the Z-direction, constrained in the X-direction and the Y-direction) downward translation of the button cap 206. In many examples, and as noted above, the bumper 224 of the button cap 206 may impact a surface of the indentation 218 after the button cap 206 translates downwardly a certain distance. For example, the bumper 224 of the button cap 206 may impact a surface of the indentation 218 that is between two of the through-holes 220. After the bumper 224 impacts said surface, the button cap 206 may continue downwardly in a cantilevered manner, pivoting on the bumper 224 as a fulcrum. As may be appreciated, the configuration of the spring plate 212 may facilitate this cantilevered motion as well; in this manner, the spring plate 212 facilitates both substantially planar downward motion in addition to cantilevered motion.

Further, in many embodiments, the inner tongue 226 and the outer tongue 228 are formed as linearly-aligned cutouts in the spring plate 212. The cutouts, as illustrated, can take a U shape. In the illustrated embodiment, the inner tongue 226 takes the shape of a small, inverted U that is inset within the larger U-shaped outer tongue 228. Particularly, in these and other embodiments, the inner tongue 226 and the outer tongue 228 are aligned to the direction along which the button cap 206 may move in a cantilevered manner after the bumper 224 impacts the surface of the indentation 218 of the housing 216. In another non-limiting phrasing, it may be appreciated that the tongues of the spring plate 212 are aligned so that the spring plate 212 can bend and deflect along the Z-direction and the Y-direction, while remaining substantially constrained in the X-direction. In many embodiments, this configuration permits tight tolerances between the housing 216 of the electronic device and the button cap 206. Similarly, this configuration permits tight tolerances between the button cap 206 and the rectilinear display area 232 (e.g., a touch-sensitive display).

Thus, generally and broadly, for many embodiments described herein, the spring plate 212 may serve several purposes including, but not limited to: providing an upward biasing force to a button cap of the button assembly; facilitating substantially planar downward translation along the Z-direction; facilitating cantilevered or partially angled translation along the Y-direction; constraining any motion or translation along the X-direction; and so on.

Figure 2B:
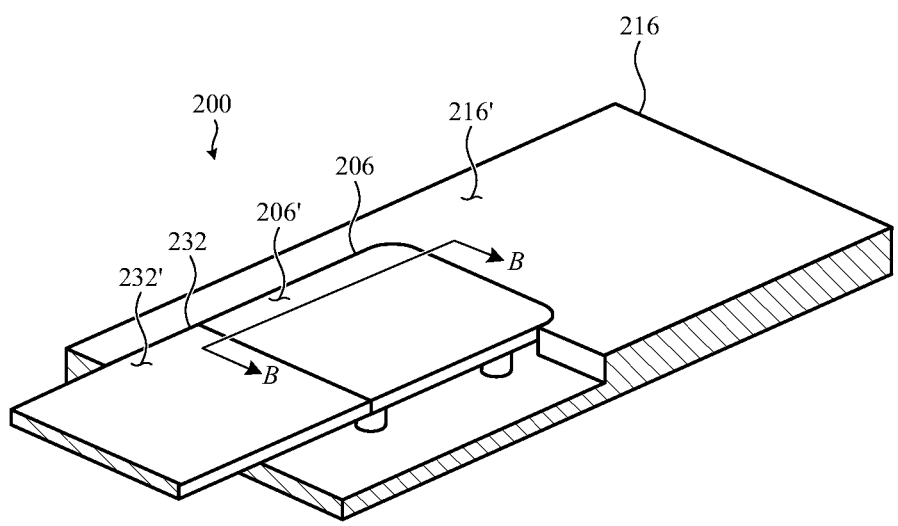
FIG. 2B depicts the button assembly of FIG. 2A assembled.

It is appreciated that, in other embodiments, the spring plate 212 may be implemented in another manner suitable to provide more constrained or less constrained motion of a button cap, such as the button cap 206. Further it is appreciated that the specific geometry of the spring plate 212 depicted in FIGS. 2A-2B is merely an example; other configurations of the spring plate 212 may be suitable in different embodiments.

In many embodiments the standoffs 222 of the button cap 206 extend through the housing 216 in order to couple to portions of the outer tongue 228 of the spring plate 212. In this manner, when a user presses the button cap 206, the standoffs 222 may travel into the housing 216 via the through-holes 220, thereby causing the outer tongue 228 of the spring plate 212 to bend inwardly with respect to the housing. When the user releases the button cap 206, the spring plate 212 provides an upwardly biasing force to return the button cap 206 to its original position.

Next, reference is made to the manner in which the fingerprint sensor 208 and/or the compressible dome switch 210 may couple to another circuit with the electronic device incorporating the same.

In the illustrated embodiment, the fingerprint sensor 208 and the electrical switch may couple to a flexible circuit 230. The flexible circuit 230 may be configured to fold below the upper assembly portion 202 over a top surface of the housing 216 of the electronic device. The flexible circuit 230 may be concealed behind an element or feature of the electronic device that is positioned adjacent to the button assembly 200, such as a rectilinear display area 232. The rectilinear display area 232 can correspond to the touch-sensitive display 108 of FIGS. 1A-1C.

As noted with respect to other embodiments described herein, when the button assembly 200 is assembled, such as shown in FIG. 2B, a top surface 206' of the button cap 206 may be substantially flush with a top surface 232' of the rectilinear display area 232 (or another element positioned nearby). In many embodiments, such as illustrated, the top surface 206' of the button cap 206 may also be substantially flush with a top surface 216' of the housing 216 of the electronic device.

In many cases, the material of the button cap 206 may be the same as the material of the top surface 232' of the rectilinear display area 232. In one example, the material may be glass or sapphire.

As with other embodiments described herein, the foregoing description of the embodiment depicted in FIGS. 2A-2B, and various alternatives thereof and variations thereto are presented, generally, for purposes of explanation, and to facilitate a thorough understanding of the detailed embodiments presented herein. However, it will be apparent to one skilled in the art that some of the specific details presented herein may not be required in order to practice a particular described embodiment, or an equivalent thereof. Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings. Particularly, it may be understood that the button assembly depicted in FIGS. 2A-2B can be implemented in a number of suitable and implementation-specific ways with additional or fewer parts than those described above.

Generally and broadly, FIGS. 3A-3C depict the button assembly of FIG. 2B taken along section line B-B. These figures illustrate the relationship between the various components of the button assembly once said assembly is fully assembled to the housing of the electronic device.

Particularly, reference is now made to FIG. 3A in which a cross-section view of the button assembly of FIG. 2B taken through section B-B of FIG. 2B is shown. The button assembly 200 is depicted with an upper assembly portion coupled to a lower assembly portion through apertures defined in the housing 216. The button cap 206 is shown with a frame 234 that supports a cover 236. The cover 236 is supported within the frame 234 by a lip 238 that extends from the frame 234. The fingerprint sensor 208, which includes a sensor portion 240 and a substrate portion 242 is disposed below the cover 236. In some cases, and as illustrated, the fingerprint sensor 208 is positioned at least partially behind the lip 238. The compressible dome switch 210 is coupled to the underside of the substrate portion 242 of the fingerprint sensor 208. The standoffs 222 extend through the housing 216 and are coupled to the spring plate 212 by the fasteners 214.

In this configuration, the button cap 206 is substantially flush with a top surface of the housing 216 and the rectilinear display area 232. In these cases, a seam 244 between the button cap 206 and rectilinear display area 232 can be minimized. In many embodiments a seam 246 between the button cap 206 and an edge of a sidewall of the indentation 218 (not shown) can have a width that is selected to facilitate a partial cantilevered rotation of the button cap 206 when the button cap 206 is depressed and the bumper 224 impacts a top surface of the indentation 218 of the housing 216, such as shown in FIG. 3B, in which a portion of the inner tongue 226 is shown, partially deflected as a result of the downward force F applied by the user.

The cantilevered rotation allows the button cap 206 to compress without impacting, touching, transferring a load, or otherwise interfering with the operation of the rectilinear display area 232. The seam 246 may also be selected so as to prevent the button cap 206 from contacting the housing 216. In other words, the seam 246 may be selected so that electrical isolation may be maintained between the button cap 206 and the housing 216. In many embodiments, the electrical isolation may assist with the operation of the fingerprint sensor 208. In some cases, either or both the seams 244, 246 may be filled with a flexible material such as silicone.

In some cases, the cover 236 may extend across only a portion of the frame 234, such as shown in FIGS. 3A-3B. In other cases, the cover 236 may extend across the entire top surface of the button cap 206, such as shown in FIG. 3C. In some cases, the frame 234 may be electrically conductive and may be electrically connected to the fingerprint sensor 208. In one example, such as shown in FIGS. 3A-3B, the frame 234 may serve as a grounding ring for the fingerprint sensor 208. In other cases, such as shown in FIG. 3C, the frame 234 may serve as a non-contact grounding ring.

Figure 4:
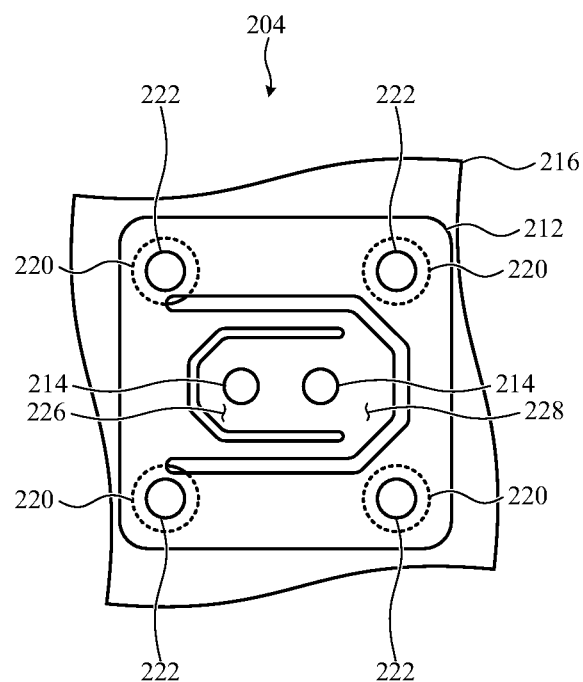
FIG. 4 depicts a bottom view of the spring plate of the button assembly of FIG. 3A

FIG. 4 depicts a bottom view of the spring plate of the button assembly of FIG. 3A, showing a lower assembly portion 204. The lower assembly portion 204 includes the spring plate 212 which is coupled to the upper assembly portion 202 via the standoffs 222 which extend through the through-holes 220 defined in the housing 216. The spring plate 212 is coupled to the housing 216 at the inner tongue 226 via the fasteners 214. In this manner, the outer tongue 228 and the remaining portions of the spring plate 212 may be free to extend into the housing 216, in response to a press of the button cap 206 (not shown).

It may be appreciated that the embodiment depicted in FIGS. 2A-4 is merely one example embodiment of a button assembly that may be used to attach a restricted-access button to the housing of an electronic device. Accordingly, it is understood that many variations and many implementations thereof may be possible in view of the disclosure provided herein.

Figure 5:
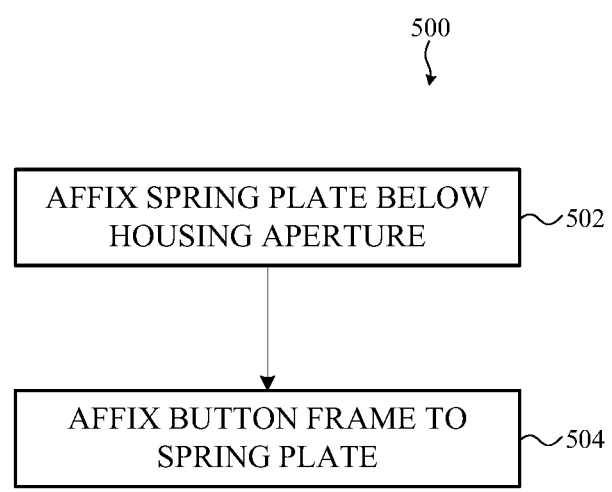
FIG. 5 depicts example operations of a method of coupling a button assembly to a housing of an electronic device.

FIG. 5 depicts example operations of a method of coupling a button assembly to a housing of an electronic device. The method 500 beings at operation 502 in which a spring plate is attached to an interior portion of a housing of an electronic device. The spring plate may be permanently or removably affixed to the housing in any number of suitable ways including, but not limited to, being affixed by: adhesive disposed between the housing and the spring plate, a mechanical fastener (such as a screw or rivet) coupling the housing and the spring plate, welding the spring plate to the housing, and so on.

Typically, as noted with respect to the embodiment depicted in FIGS. 2A-2B, the spring plate may be affixed to the housing below an aperture defined in the housing. The aperture permits a portion of the frame of the button assembly to extend through the housing and couple to the spring plate. Accordingly, at operation 504, the method continues by affixing the button frame to the spring plate. The button frame may be permanently or removably affixed to the housing in any number of suitable ways including, but not limited to, being affixed by: adhesive disposed between the button frame and the spring plate, a mechanical fastener (such as a screw or rivet) coupling the button frame and the spring plate, welding the button frame to the spring plate, and so on.

Figure 6:
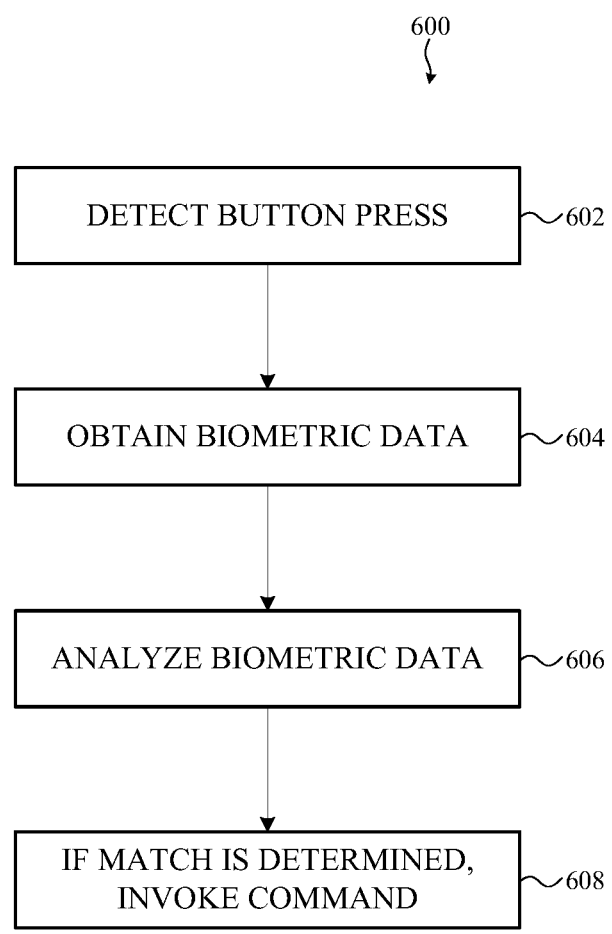
FIG. 6 depicts example operations of a method of operating a button that incorporates a biometric sensor.

FIG. 6 depicts example operations of a method of operating a button that incorporates a biometric sensor. The method 600 may be performed by an electronic device, such as the laptop 100 or the keyboard 102 depicted in FIGS. 1A-1C. In other examples, the method 600 can be performed, at least in part by, without limitation: one or more processors, one or more digital circuits, one or more analog circuits, one or more computing devices (either remote or local) in communication with one another, computer- or processor-executable instructions stored in a non-transitory memory, or any combination thereof.

The method 600 begins at operation 602 in which a button press may be detected. A button press may be detected by, without limitation: a capacitive sensor, a resistive sensor, an electrical impedance sensor, a collapsible dome switch, a tilt switch, a piezoelectric charge detector, and so on. In some cases, a button press may be detected by a biometric sensor. In other cases, a button press may be detected by an electrical switch such as a dome switch.

Next at operation 604, biometric data can be obtained by the biometric sensor. In many examples, biometric data may be a fingerprint. In other examples, biometric data may be any other suitable biometric data such as, but not limited to: heart rate, blood oxygenation, respiration rate, median arterial pressure, galvanic skin response, vein patterns, and so on. In some examples, multiple biometric characteristics may be obtained. For example, in one embodiment, a fingerprint and a heart rate may be measured. In other examples, a fingerprint and a galvanic skin response can be measured. In other cases, different biometric characteristics, or combinations of characteristics may be measured or otherwise obtained.

Next, at operation 606, the biometric data obtained at operation 604 may be analyzed. In one example, the biometric data may be compared to previously-obtained data (or template data derived from previously-obtained data). For example, a fingerprint image obtained at operation 604 may be compared to each of a set of previously-obtained fingerprint images and/or templates derived from previously-obtained fingerprint images.

The biometric data may be compared to the previously-obtained data (or template data) in order to determine a statistical likelihood that the biometric data obtained at operation 604 matches that of at least one of the previously-obtained data (or templates). In some examples, the statistical likelihood may be a match coefficient that represents a confidence interval that the obtained biometric data is a match for at least one of the previously-obtained biometric data. In many cases, the match coefficient may be compared to a threshold; only if the match coefficient exceeds the threshold is a positive match identified.

In other cases, the biometric data can be directly compared to a threshold in order to determine whether a positive match should be identified. For example, if the biometric data is related to a user's heart rate, the operation of analyzing the biometric data may include determining whether the user's measured heartrate exceeds a certain minimum threshold. In other cases, a maximum threshold may be used. In still further cases, it may be determined whether the biometric data falls within a particular range.

Once a positive match is determined (e.g., via comparison to previously-obtained biometric data and/or via comparison to pre-determined thresholds), the method may continue to operation 608 and the command associated with the button is invoked. In some instances, if a positive match is not determined and/or the user is not authorized to perform a function or command associated with the button, then the button press may be ignored or suppressed by the device.

Although many embodiments described and depicted herein reference restricted-access buttons incorporated within keyboard devices, it should be appreciated that other implementations can take other form factors. Thus, the various embodiments described herein, as well as functionality, operation, components, and capabilities thereof, may be combined with other elements as necessary, and so any physical, functional, or operational discussion of any element or feature is not intended to be limited solely to a particular embodiment to the exclusion of others.

For example, although the electronic device is shown in FIGS. 1A-1C as a laptop keyboard, it may be appreciated that other electronic devices are contemplated. For example, the electronic device can be implemented as a different peripheral input device, a desktop computing device, a handheld input device, a tablet computing device, a cellular phone, a wearable device, and so on.

Further, it may be appreciated that the electronic device can include one or more components that interface or interoperate, either directly or indirectly, with the restricted-access button 110 which, for simplicity of illustration are not depicted in FIGS. 1A-1C. For example, the electronic device may include a processor coupled to or in communication with a memory, a power supply, one or more sensors, one or more communication interfaces, and one or more input/output devices such as a display, a speaker, a rotary input device, a microphone, an on/off button, a mute button, a separate biometric sensor, a camera, a force and/or touch sensitive trackpad, and so on.

In some embodiments, the communication interfaces provide electronic communications between the electronic device and an external communication network, device (such as the laptop 100) or platform. The communication interfaces can be implemented as wireless interfaces, Bluetooth interfaces, universal serial bus interfaces, Wi-Fi interfaces, TCP/IP interfaces, network communications interfaces, or any conventional communication interfaces. The electronic device may provide information related to externally connected or communicating devices and/or software executing on such devices, messages, video, operating commands, and so forth (and may receive any of the foregoing from an external device), in addition to communications. As noted above, for simplicity of illustration, the electronic device is depicted in FIGS. 1A-1C without many of these elements, each of which may be included, partially, optionally, or entirely, within the laptop 100.

As used herein, the phrase "laptop computer" and "laptop computing device" (and related phrases and terms), generally refer to the class of personal, corporate, and/or industrial computing devices having a form factor that accommodates and facilitates mobile and/or portable use of the device. Such devices may alternatively be referred to as, without limitation, laptops, notebooks, netbooks, ultrabooks, gaming stations, detachables, tablets with keyboards, portable terminals, portable workstations, all-in-one devices, hybrid computing devices, and so on. Typically, a laptop computer includes a keyboard section and a primary display section separated by a hinge or other removable or fixed coupling, although other implementations are possible. More particularly, the keyboard section may be detachable, removable, or permanently affixed to the primary display section. In many examples, a laptop computer may include a battery or other untethered power source, although this may not be required. It may be appreciated that the specific examples of "laptop computers" listed above are not exhaustive; additional portable device implementations may be considered a laptop computer in the spirit and scope of this disclosure.

However, for simplicity of description and to emphasize that the embodiments presented herein are not limited to one particular electronic device type or implementation, the embodiments that follow are described simply in reference to an "electronic device." The electronic device referenced in the following embodiments and examples can be any suitable electronic device. For example, the electronic device may be a mobile, stationary, or portable electronic device such as, but not limited to: laptop computing devices (such as the laptop 100 depicted in FIGS. 1A-1C), a desktop computer, a tablet computer, a cellular phone, an automotive or vehicle control system, an industrial control system, a home or commercial appliance, a home automation device, or any other suitable electronic device.

In some embodiments, the example electronic device can be configured to, at least partially, surround a display, such as the touch-sensitive display 108. As noted above, in many embodiments, the touch-sensitive display 108 may incorporate an input device configured to receive touch input, force input, and the like and/or may be configured to output information to a user. The touch-sensitive display 108 can include a display that can be implemented with any suitable technology, including, but not limited to, a multi-touch or multi-force sensing touchscreen that uses liquid crystal display technology, light-emitting diode technology, organic light-emitting display technology, organic electroluminescence technology, or another type of display technology.

The example electronic device can form an outer surface or partial outer surface and protective case for the internal components of the electronic device. In the illustrated embodiment, the electronic device is formed in a substantially rectangular shape, although this configuration is not required. The electronic device can be formed of one or more components operably connected together, such as a front piece and a back piece or a top clamshell and a bottom clamshell. Alternatively, the electronic device can be formed of a single piece (e.g., uniform body or unibody).

Further, it may be appreciated that, although reference is made herein to the orientation of particular objects and elements, it should be understood that such orientations may be altered or varied in certain embodiments. Likewise, orientations and directions discussed herein are generally provided with respect to the figures herein. Accordingly, "up," "down," "upper," "lower," "front," "rear," "side" and like terms are intended as relative terms, not absolute.

Further, it should be appreciated that the various embodiments described herein, as well as the functionality, operation, components, and capabilities thereof may be combined with other elements or embodiments as necessary, and so any physical, functional, or operational discussion of any element, feature, structure, or interrelation therebetween is not intended to be limited solely to a particular embodiment to the exclusion of others.

One may appreciate that although many embodiments are disclosed above, that the operations and steps presented with respect to methods and techniques described herein are meant as exemplary and accordingly are not exhaustive. One may further appreciate that alternate step order or, fewer or additional steps may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

The present disclosure recognizes that personal information data, including biometric data, in the present technology can be used to the benefit of users. For example, the use of biometric authentication data can be used for convenient access to device features without the use of passwords. In other examples, user biometric data is collected for providing users with feedback about their health or fitness levels. Further, other uses for personal information data, including biometric data, that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure, including the use of data encryption and security methods that meet or exceed industry or government standards. For example, personal information from users should be collected for legitimate and reasonable uses of the entity and not shared or sold outside of those legitimate uses. Further, such collection should occur only after receiving the informed consent of the users. Additionally, such entities should take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data, including biometric data. That is, the present disclosure contemplates that hardware and/or software elements can be provided to prevent or block access to such personal information data. For example, in the case of biometric authentication methods, the present technology can be configured to allow users to optionally bypass biometric authentication steps by providing secure information such as passwords, personal identification numbers (PINS), contact gestures, or other authentication methods, alone or in combination, known to those of skill in the art. In another example, users can select to remove, disable, or restrict access to certain health-related applications collecting users' personal health or fitness data.

What is claimed is:

1. A laptop computing device comprising:
an upper portion comprising a display;
a hinge;
a lower portion coupled to the upper portion by the hinge; and
a keyboard coupled to the lower portion and comprising a set of depressible keys including a depressible power button comprising:
a cap configured to receive a touch input and a press input, the cap configured to move from an undepressed position to a depressed position in response to the press input;
a biometric sensor positioned below the cap and configured to obtain fingerprint information in response to the touch input, the laptop computing device configured to authorize a function in response to the fingerprint information corresponding to stored information associated with an authorized user;
a compressible switch positioned below the biometric sensor and configured to detect the press input; and
a spring plate positioned below the cap and configured to resist movement of the cap in response to the touch input and deform out of plane in response to the cap moving from the undepressed position to the depressed position.

2. The laptop computing device of claim 1, wherein the depressible power button is configured to change a power state of the laptop computing device in response to the press input and the fingerprint information corresponding to the stored information associated with the authorized user.

3. The laptop computing device of claim 1, wherein the biometric sensor is a capacitive sensor that is positioned between the compressible switch and the cap.

4. The laptop computing device of claim 1, wherein:
the lower portion defines an indentation that is recessed with respect to an upper surface of the lower portion; and
the keyboard and the depressible power button are positioned within the indentation.

5. The laptop computing device of claim 1, further comprising a secondary display positioned in the lower portion.

6. The laptop computing device of claim 1, wherein the cap comprises a sapphire material that forms a top surface of the depressible power button.

7. The laptop computing device of claim 1, wherein the spring plate is configured to restore the cap to the undepressed position in response to the press input being released.

8. The laptop computing device of claim 7, wherein the spring plate is positioned below the compressible switch.

9. A laptop computing device comprising:
an upper portion comprising a display;
a hinge;
a lower portion coupled to the upper portion by the hinge; and
a depressible power button coupled to the lower portion and comprising:
a cap defining a top surface of the depressible power button and configured to receive a touch input and a press input;
a spring plate positioned below the cap and configured to bend inward in response to the press input and to maintain the cap in an undepressed position in response to the touch input;
a biometric sensor positioned below the cap and above the spring plate, the biometric sensor configured to obtain a biometric in response to the touch input; and
a compressible switch positioned below the biometric sensor and above the spring plate, the compressible switch configured to detect the press input.

10. The laptop computing device of claim 9, wherein:
the lower portion comprises a keyboard comprising a set of depressible keys; and
the set of depressible keys comprises the depressible power button.

11. The laptop computing device of claim 9, wherein the laptop computing device is configured to authorize a function in response to the touch input corresponding to a touch by an authorized user.

12. The laptop computing device of claim 9, wherein the spring plate defines a set of cutouts that facilitates deflection of the spring plate in response to the press input.

13. The laptop computing device of claim 9, wherein the spring plate comprises:
an inner tongue that is coupled to the lower portion: and
an outer tongue that is coupled to the cap and configured to bend with respect to the lower portion in response to the press input.

14. The laptop computing device of claim 9, wherein the depressible power button is configured to change a power state of the laptop computing device in response to the press input and in response to the biometric corresponding to stored information associated with an authorized user.

15. The laptop computing device of claim 14, wherein:
the laptop computing device is configured to identify the authorized user based on the biometric; and
in response to identifying the authorized user, the laptop computing device is configured to change the power state of the laptop computing device.

16. A laptop computing device comprising:
an upper portion comprising a display;
a hinge;
a lower portion coupled to the upper portion by the hinge; and
a power button positioned within an indentation in the lower portion and comprising:
a cap defining an upper surface of the power button and configured to transition between an undepressed position and a depressed position;
a biometric sensor positioned below the cap;
a spring plate positioned below the cap; and
a compressible switch positioned below the biometric sensor; wherein:
in response to a user touch, the spring plate is configured to resist movement of the cap to maintain the cap in the undepressed position and the biometric sensor is configured to detect a fingerprint; and
in response to a user press, a portion of the spring plate is configured to bend away from the cap to allow the cap to move to the depressed position and the compressible switch is configured to detect movement of the cap.

17. The laptop computing device of claim 16, wherein:
in response to the biometric sensor detecting the fingerprint of an authorized user, the laptop computing device is configured to authorize a function; and in response to the compressible switch detecting movement of the cap to the depressed position, the power button is configured to change a power state of the laptop computing device.

18. The laptop computing device of claim 16, wherein:
the cap comprises a sapphire material that defines the upper surface; and
the biometric sensor comprises a capacitive sensor that is configured to detect the fingerprint of the user touch applied to the sapphire material.

19. The laptop computing device of claim 16, wherein the spring plate is coupled to the cap by a standoff.

20. The laptop computing device of claim 19, wherein, in response to the user press, the spring plate is configured to bend to facilitate movement of the cap to the depressed position.

* * * * *